(12) United States Patent
Yamashita et al.

(10) Patent No.: US 6,884,344 B2
(45) Date of Patent: Apr. 26, 2005

(54) HYDROGEN-DISSOLVED WATER PRODUCTION APPARATUS

(75) Inventors: Yukinari Yamashita, Tokyo (JP); Takashi Futatsuki, Tokyo (JP)

(73) Assignee: Organo Corporation, Tokyo (JP)

( * ) Notice: Subject to any disclaimer, the term of this patent is extended or adjusted under 35 U.S.C. 154(b) by 53 days.

(21) Appl. No.: 10/329,899

(22) Filed: Dec. 26, 2002

(65) Prior Publication Data

US 2003/0132104 A1 Jul. 17, 2003

(30) Foreign Application Priority Data

Jan. 15, 2002 (JP) ........................................ 2002-005879

(51) Int. Cl.[7] ................................................. C02F 1/68
(52) U.S. Cl. ..................... 210/195.2; 210/199; 210/202; 210/900
(58) Field of Search ............................. 210/199, 195.2, 210/202, 900, 763, 757

(56) References Cited

U.S. PATENT DOCUMENTS 5,720,869 A * 2/1998 Yamanaka et al. .......... 210/638
6,431,281 B1 * 8/2002 McNab et al. ............... 166/279
2002/0063088 A1 * 5/2002 Hidaka et al. ............... 210/263
2003/0094610 A1 * 5/2003 Aoki et al. ................... 257/48

* cited by examiner

Primary Examiner—Duane Smith
Assistant Examiner—Douglas J. Theisen
(74) Attorney, Agent, or Firm—Osha & May L.L.P.

(57) ABSTRACT

A degassing device (10), a hydrogen dissolving device (12), and a palladium catalyst column (17) are provided in that order downstream of a high-purity water production device (1), and an impurity removal device (19) is connected to the exit side of treated water of the palladium catalyst column (17). The impurity removal device (19) removes impurity ions which are eluted into the water to be treated or impurity particulates which mix in with the water to be treated during the treatment in the palladium catalyst column (17). The impurity removal device (19) comprises an ion exchange device (20) and a membrane treatment device (21) such as a ultrafiltration membrane device, a reverse osmosis membrane device or the like. By providing an impurity removal device (19) in this manner, it is possible to remove impurities generated during hydrogen peroxide removal treatment by the palladium catalyst and to prevent degradation in quality of hydrogen-dissolved water.

9 Claims, 3 Drawing Sheets

HYDROGEN-DISSOLVED WATER PRODUCTION APPARATUS

BACKGROUND OF THE INVENTION

1. Field of the Invention

The present invention relates to an apparatus for producing hydrogen-dissolved water used as wash water or immersion water in a manufacturing process of semiconductor devices.

2. Description of the Related Art

In recent years, higher integration in a VLSI (very large scale integration) and higher fineness in wiring have been achieved. Consequently, in order to increase the degree of integration per unit area, various techniques have been developed for improving flatness of the surface of the substrate and for providing multi-layer wirings, and low resistance materials are being used for the wirings in order to realize high fineness for the wirings.

Most of the components of an LSI are formed on a silicon substrate. A typical manufacturing method of the LSI includes the following steps. Namely, the manufacturing method includes an oxidizing step for forming an oxide film in a high temperature diffusion furnace over the surface of a silicon wafer which has been polished in a mirror-like manner; a photoresist applying step for applying a photoresist (a photosensitive agent) over the insulated film to introduce photosensitivity; an exposing step for covering the wafer with a mask onto which a predefined pattern is drawn and for irradiating light for exposing the photoresist onto the wafer through the mask to print a pattern identical to the pattern drawn on the mask; a developing and etching step for removing the exposed portion only of the resist using a developing agent and immersing the wafer into an etching solution or the like to etch the insulated film of the exposed portion; an oxidizing and diffusing step for injecting an impurity into the silicon surface exposed as a result of the developing and etching step; and a metallizing step for creating a metal film layer for forming a wiring over the wafer surface. When a multi-layer wiring scheme is employed, another insulated film is created and then steps similar to those described above are repeated.

A wash step after a polishing step which is performed to flatten the substrate surface is very important in order to prevent wiring defects caused by residual impurities. Those impurities which are to be removed primarily include the residual abrasive grains of the polishing step. In order to remove these impurities, conventionally, high-purity water has been used in the main. In recent years, in addition to controlling the number of particulates remaining on the substrate surface after the washing step, the size of residual particulates is also controlled. In other words, due to the recent demands for higher degree of integration of the device itself and improvements in the performance of inspection apparatuses for the devices, the size of residual particulates is now controlled more strictly at a finer size level. The particulates to be controlled nowadays include those having a diameter of 0.12 µm or less.

With such increase in the cleanliness of semiconductor devices, the use of wash liquids that have a higher washing capability than high-purity water are widely used. Wash liquids having a high washing capability includes electrolytically ionized water obtained through electrolysis of water, hydrogen-dissolved water obtained by dissolving hydrogen gas into high-purity water, an alkali solution to which a chelate agent is added, and so on. Of these, the first two wash liquids have attracted attention as wash liquid having less environmental impacts because the amounts of additives to these wash liquids are very small and it is quite safe to handle these wash liquids.

For the electrolytically ionized water, by applying an electrolysis process to deionized water or high-purity water, anode water which is acidic is obtained in an anode chamber and cathode water which is reductive is obtained in a cathode chamber. By adding an acid, in particular, a hydrochloric acid, to the anode water, it is possible to obtain water quality which is acidic and wherein the oxidizing capability is higher. Similarly, by adding a base to the cathode water, it is possible to obtain water quality which is alkaline and wherein the reducing capability is higher. The anode water is used for removal of metals and sterilization, whereas the cathode water is used for removal of particulates and prevention of re-adhesion. The hydrogen-dissolved water is obtained by dissolving hydrogen gas into deionized water or high-purity water. As a method for dissolving hydrogen gas, typically, a method for contacting deionized water or high-purity water with hydrogen gas using a gas dissolving membrane in which a tube charged with hollow fiber membranes is widely employed because this method is highly efficient in dissolving hydrogen. Methods for supplying hydrogen include a method for using hydrogen gas used for semiconductor manufacturing, a method for using a hydrogen gas bomb, a method for using hydrogen gas generated through electrolysis of water, and so on. Of these, because of the cleanliness of the hydrogen gas and simplicity of equipment, the method for using hydrogen gas generated through electrolysis of water is often employed. The hydrogen-dissolved water is used for removing particulates and for preventing re-adhesion just like the cathode water of electrolytically ionized water.

In the manufacturing process of semiconductor devices, presence of any impurity is not desirable. Pollution by particulates causes pattern defects and degrades the reliability of insulated film. Impurities other than particulates include metals which cause degradation of the reliability of insulated film and various leak currents, organic substances which cause an increase in the contact resistance and degradation of the reliability of insulated film, inorganic ions, and unintentional formation of a natural oxide film. Because these impurities cause various defects, it is desired that these impurities be removed from the wash liquid to the maximum degree.

With the current technology, the quality of high-purity water that can be obtained by a typical high-purity water production apparatus used for manufacturing of an LSI of sub-micron design rule is, for example, as indicated in Table 1 shown below. With high-purity water having such quality, it is currently considered that no impurity attributed to the high-purity water adheres to the surface of the semiconductor substrate during a rinse treatment by the high-purity water.

TABLE 1

| | |
|---|---|
| ELECTRICAL RESISTIVITY | 18.2 MΩ · cm or greater |
| TOTAL ORGANIC CARBON | 1 µg C/liter or less |
| NUMBER OF PARTICULATES | 1/milliliter or less |
| | (particle size 0.05 µm or greater) |
| NUMBER OF LIVE MICROBES | 0.1/liter or less |
| SILICA | 0.1 µg SiO$_2$/liter or less |
| SODIUM | 0.005 µg Na/liter or less |
| IRON | 0.005 µg Fe/liter or less |
| COPPER | 0.005 µg Cu/liter or less |

TABLE 1-continued

| | |
|---|---|
| CHLORIDE ION | 0.005 μg Cl/liter or less |
| CONCENTRATION OF HYDROGEN ION (pH) | 7.0 |
| OXIDATION-REDUCTION POTENTIAL (ORP) | +350 mV (vs. NHE) |
| CONCENTRATION OF DISSOLVED OXYGEN (DO) | 2 μg O/liter or less |

A high-purity water production device comprises a primary deionized water production device for obtaining primary deionized water by treating raw water with a coagulation and sedimentation device, a sand filter, an activated carbon filter, a reverse osmosis membrane device, a two-bed 3-tower ion exchange system, a mixed-bed ion exchange system, and a micronic filter, etc., and a secondary deionized water production apparatus for obtaining secondary deionized water by storing the primary deionized water in a primary deionized water tank and then treating the primary deionized water with an ultraviolet oxidation device, a cartridge polisher, and a membrane treatment device such as an ultrafiltration device and a reverse osmosis membrane device and so forth. By applying a secondary treatment to the primary deionized water, it is possible to remove residual particulates, colloidal materials, organic substances, metals, anions, etc. as much as possible to obtain high-purity water.

The high-purity water having the water quality as indicated in the above Table 1 is also used, for example, as the raw water for producing the electrolytically ionized water and hydrogen-dissolved water.

There is, however, a problem with the current high-purity water production scheme in that in the ultraviolet oxidation device used for achieving a desired value for the TOC concentration which is one of the parameters that must be controlled, hydrogen peroxide is generated albeit a very slight amount. In particular, in the ultraviolet oxidation device used for decomposing organic substances among the processing steps for the high-purity water, ultraviolet rays having a central wavelength of 185 nm are irradiated. In this process, the irradiated ultraviolet rays also decompose water molecules to produce hydrogen peroxide which is an oxidizing material. The amount of produced hydrogen peroxide is approximately 10 μg/L to several tens of μg/L, but the presence of the hydrogen peroxide sometimes causes unexpected oxidation during the manufacturing process of semiconductor devices.

The hydrogen peroxide continues to remain in the electrolytically ionized water or the hydrogen-dissolved water prepared from high-purity water containing a slight amount of hydrogen peroxide. In general, no reaction takes place between the slight amount of hydrogen peroxide and hydrogen gas within the high-purity water by merely mixing within a gas dissolving membrane unit. Although the electrolytic cathode water and hydrogen-dissolved water show reductive properties, the presence of a minute amount of hydrogen peroxide therein may cause unexpected oxidation to occur in the manufacturing process of semiconductor device.

As described earlier, in recent years, higher and higher fineness of semiconductor devices is being achieved. In addition to reducing the width of the wirings, reduction in the thickness of the wiring, insulated film, etc. are also desired as an essential requirement. As a substrate used for manufacturing of semiconductor devices, a silicon wafer is widely employed. In this case, a silicon oxide film is formed as the insulated film, and in some cases, the thickness of the silicon oxide film is controlled to the order of few nanometers. Because of this, the unexpected oxidation due to the presence of oxidizing materials in high-purity water can no longer be neglected.

SUMMARY OF THE INVENTION

The present inventors have found after extensive review of methods for removing the above-mentioned hydrogen peroxide, that although typical treatment methods such as a method for using an activated carbon and a neutralization treatment method wherein a reductive material is added, are effective for treatment of waste water, as these methods significantly increases the TOC concentration in the high-purity water and ionic load on the ion exchange resins, these methods are not suitable for application to the wash water of semiconductor devices. After a further review, the present inventors have found that a method for removing hydrogen peroxide by allowing the high-purity water to contact a palladium catalyst is a superior method achieving a high removal efficiency.

However, after an even further review, the present inventors have found that in this treatment for removing hydrogen peroxide using a palladium catalyst, there is a problem in that the wash target may be polluted by impurities eluting from the palladium catalyst. With a palladium catalyst having an anion ion exchange resin base, normally, there is no possibility of impurity elution because the palladium catalyst is sufficiently purified before the use, but as its performance is degraded due to a long-term use, a problem occurs in that amine compounds attributed to the material of the base resin are detached from an ion exchange resin functioning as a carrier and elute into the high-purity water, or in that the ion exchange resin may be fractured and the fractured particulates may be mixed in with the high-purity water.

For normal ion exchange resins, it is possible to obtain guideline information for replacement or regeneration by observing reduction of specific resistance (electric resistivity) of the treated water. For the palladium catalyst, by contrast, the degradation in the resin performance is less noticeable as no such degradation in water quality occurs.

Accordingly, one object of the present invention is to provide a hydrogen-dissolved water production apparatus wherein any impurities generated during a treatment for the removal of hydrogen peroxide using a palladium catalyst can be reliably eliminated and degradation of quality of high-purity water can be prevented.

According to one aspect of the present invention, there is provided a hydrogen-dissolved water production apparatus comprising a hydrogen dissolving device for dissolving hydrogen in degasified high-purity water; a palladium catalyst device for removing hydrogen peroxide contained in high-purity water; and an impurity removal device provided at the exit side of the treated water of the palladium catalyst device.

With such an apparatus, it is possible to remove, with the use of the palladium catalyst device, hydrogen peroxide generated when the ultraviolet oxidation treatment is effected in the high-purity water production apparatus, and, at the same time, to reliably remove, with the use of the impurity removal device, impurity ions eluted into the water to be treated during the treatment by the palladium catalyst device and impurity particulates mixed in with the water to be treated. In this manner, it is possible to prevent degradation of the quality of the hydrogen-dissolved water, and, when the hydrogen-dissolved water is used as wash water, immersion water, etc., it is possible to achieve an advantage in that a high quality treatment can be effected.

DESCRIPTION OF PREFERRED EMBODIMENTS

Preferred embodiments of the present invention will now be described with reference to the drawings.

Figure 1:
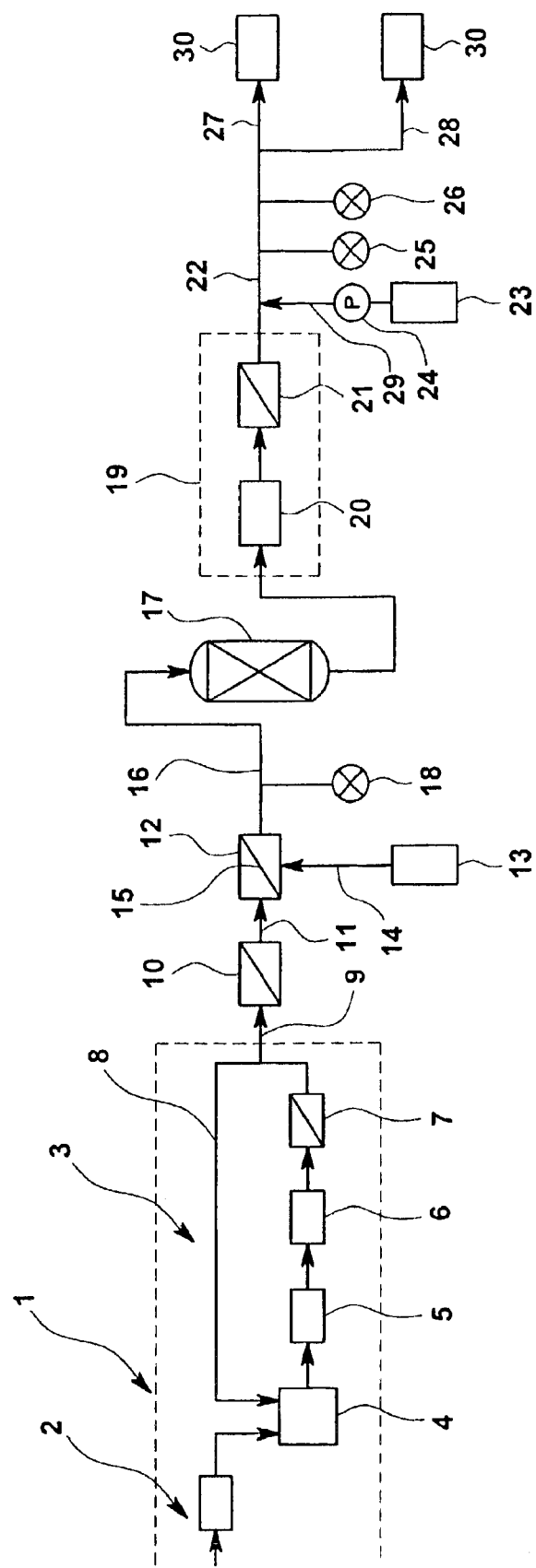
FIG. 1 is a schematic diagram showing a first preferred embodiment of the present invention.

FIG. 1 shows an example structure of an apparatus according to the present invention. In FIG. 1, reference numeral 1 denotes a high-purity water production apparatus. The high-purity water production apparatus comprises a primary deionized water production device 2 and a secondary deionized water production device 3. Although not shown, the primary deionized water production device comprises, for example, a coagulation and sedimentation device, a sand filter, an activated carbon filter, a reverse osmosis membrane device, a two-bed 3-tower ion exchange system, a mixed-bed ion exchange system, and a micronic filter. The primary deionized water production device produces primary deionized water by carrying out a pretreatment of raw water using the coagulation and sedimentation device, the sand filter, and the activated charcoal filter and then carrying out a treatment consisting of the reverse osmosis membrane device, the two-bed 3-tower ion exchange system, the mixed-bed ion exchange system, and the micronic filter. In FIG. 1, reference numeral 4 represents a primary deionized water tank which stores the primary deionized water produced by the primary deionized water production device.

The secondary deionized water production device 3 comprises an ultraviolet oxidation device 5, an ion exchange device 6 such as a mixed-bed cartridge polisher, and a membrane treatment device 7 such as an ultrafiltration device, a reverse osmosis membrane device and so forth. The secondary deionized water production device 3 treats the primary deionized water with the ultraviolet irradiation treatment, ion exchange treatment, and ultrafiltration treatment so that residual particulates, colloidal materials, organic substances, metal ions, anions, etc., are removed and high-purity water is obtained. Reference numeral 8 represents a circulation line which connects the exit side of the secondary deionized water production device 3 to the primary deionized water tank 4 and allows circulation of remaining high-purity water to the primary deionized water tank 4.

A degassing device 10 is connected, via a pipe 9, to the high-purity water production apparatus 1 having a structure as described above. Further, a hydrogen dissolving device 12 is connected, via a pipe 11, to the degassing device 10. The degassing device 10 is provided for removing particularly the oxygen gas, nitrogen gas, and carbon dioxide gas dissolved in the high-purity water. Although the structure of the degassing device 10 is not limited, it is preferable to employ a structure in which degassing under vacuum is effected through a gas permeable membrane. The degassing device 10 is provided upstream of the hydrogen dissolving device 12.

In this manner, degassing is carried out prior to the hydrogen dissolving step. It is preferable that the degassing is effected such that the concentration of one or more dissolved gases among the oxygen gas, nitrogen gas, and carbon dioxide gas becomes less than 10 ppm, more preferably, 2 ppm or less. When the concentration of the dissolved gas is 10 ppm or more, it is not possible to dissolve a sufficient amount of hydrogen during the hydrogen dissolving step and it is difficult to finely adjust the amount of dissolved hydrogen. In addition, when the concentration of the dissolved gas is 10 ppm or more, bubbles are formed when wash treatment is performed using the hydrogen-dissolved water and then adheres to the wash target, causing a disadvantage that the washing effect at the portions to which the bubbles are adhered is reduced.

The degassing device can serve its purpose as long as it is located at any point upstream of the hydrogen dissolving device 12, it is possible to provide the degassing device 10 within the high-purity water production device 1. In this case, because nitrogen gas is supplied as purge gas into the primary deionized water tank 4 and the nitrogen gas must also be removed, the degassing device 10 is provided downstream of the primary deionized water tank 4, that is, within the secondary deionized water production device 3.

The hydrogen dissolving device 12 is provided for dissolving hydrogen in the high-purity water which has been degassified. As the hydrogen dissolving device 12, it is preferable to use a device comprising a gas permeable membrane 15 and wherein hydrogen is dissolved through the gas permeable membrane 15. Among such a structure, it is preferable to use a structure in which the gas permeable membrane 15 is formed as a hollow fiber, and in particular, a module structure of a plurality of hollow fiber membranes placed in parallel. In addition to the above described structure, the examples of hydrogen dissolving device 12 of the present invention include a device in which hydrogen gas is dissolved in high-purity water through bubbling, a device in which hydrogen gas is dissolved in high-purity water through an ejector, and a device in which hydrogen gas is supplied to the upstream of a pump for supplying high-purity water and the hydrogen gas is dissolved through stirring within the pump.

A hydrogen supply device 13 is connected, via a pipe 14, to the hydrogen dissolving device 12, and hydrogen gas is supplied from the hydrogen supply device 13 to the hydrogen dissolving device 12. As the hydrogen supply device 13, a water electrolysis device, a hydrogen bomb, etc. is used. When a water electrolysis device is employed, normally, high-purity water is supplied to the electrolysis device which is then decomposed through electrolysis within the electrolysis device and high-purity hydrogen gas is generated in a cathode chamber of the electrolysis device. The generated hydrogen gas is introduced into the hydrogen dissolving device 12 through the pipe 14.

The hydrogen-dissolved water obtained at the hydrogen dissolving device 12 by dissolving hydrogen gas in high-purity water has a negative oxidation-reduction potential. In other words, the oxidation-reduction potential of the hydrogen-dissolved water is on the side of reductive potential. For example, it is possible to set the oxidation-reduction potential of the hydrogen-dissolved water to be in a range of $-100$ mV to $-600$ mV. It is preferable that the concentration of dissolved hydrogen within the hydrogen-dissolved water at 25° C. and 1 atmosphere is 0.05 ppm or more, and in particular, in a range of 0.8 ppm–1.6 ppm. If the concentration of dissolved hydrogen is less than 0.05 ppm, it is not possible to sufficiently shift the oxidation-reduction potential of the hydrogen-dissolved water to the reductive side, and, as a result, the efficiency for removing particulates on the surface of the wash target when the hydrogen-dissolved water is used as a wash liquid is degraded.

A palladium catalyst device is connected, via a pipe 16, to the hydrogen dissolving device 12. This palladium catalyst device is represented in FIG. 1 as a palladium catalyst column 17 and is formed by filling a column with a palladium catalyst. During the ultraviolet oxidation step in the high-purity water production process, hydrogen peroxide is generated and is dissolved into the high-purity water. Through the treatment at the palladium catalyst column 17, this hydrogen peroxide reacts with hydrogen present in the high-purity water and is removed.

It is preferable to use a palladium catalyst in which a metal palladium is dotted on an ion exchange resin carrier such as an anion exchange resin carrier. As earlier described, a problem to be solved by the invention is the generation of impurities when a palladium catalyst having an ion exchange resin carrier is used. However, even when a material other than an ion exchange resin is employed as the carrier, impurities may be generated in a similar manner. Therefore, the present invention is not limited to a palladium catalyst wherein an ion exchange resin is used as the carrier, but may also be applied to the cases wherein an activated carbon, a synthetic adsorbent, or an inorganic exchanger is used as the carrier.

In the palladium catalyst column 17, hydrogen must be supplied for the hydrogen peroxide removal by dint of the palladium catalyst. Because the high-purity water which contacts the palladium catalyst is hydrogen-dissolved water, it is not necessary to separately supply hydrogen to the palladium catalyst column 17. Because hydrogen within the hydrogen-dissolved water is consumed in an amount necessary to remove hydrogen peroxide, hydrogen must be dissolved in excess to provide this extra amount needed for the hydrogen peroxide removal treatment. Therefore, in the hydrogen dissolving device 12, an amount of hydrogen to be dissolved is determined by adding the amount of hydrogen necessary for the hydrogen peroxide removal treatment to the amount of hydrogen necessary for obtaining hydrogen-dissolved water with a negative oxidation-reduction potential.

Referring to FIG. 1, reference numeral 18 represents a concentration meter for dissolved hydrogen. The concentration meter for dissolved hydrogen 18 measures the concentration of hydrogen dissolved in the high-purity water and adjusts the concentration of dissolved hydrogen to a predetermined value by controlling the amount of hydrogen to be dissolved.

An impurity removal device 19 is connected downstream of the palladium catalyst column 17, that is, to the exit side of the treated water of the palladium catalyst column 17. The impurity removal device 19 is provided for removing impurities generated through the hydrogen peroxide removal by the palladium catalyst column 17 and is preferably a device which allows removal of ions and particulates. In other words, as the palladium catalyst is used for a long period of time, the catalyst is degraded and amine compounds and other functional groups are detached from the anion exchange resin functioning as a carrier and eluted into the water to be treated (hydrogen-dissolved water). In addition, the ion exchange resin may be fractured and the fractured particulates may mix in with the water to be treated (hydrogen-dissolved water). These ions and particulates must be removed. Moreover, even when the carrier is made of a material other than an ion exchange resin, a similar problem of mixture of ions and particulates into the water to be treated (hydrogen-dissolved water) is encountered, and thus, these ions and particulates must be removed just like the case of the anion exchange resin. An ion exchange device is preferable for removing ions and a membrane treatment device such as a ultrafiltration membrane device, a reverse osmosis membrane device or the like is preferable for removing particulates.

The impurity removal device 19 shown in FIG. 1 comprises an ion exchange device 20 and a membrane treatment device 21 such as a ultrafiltration device, a reverse osmosis membrane device or the like. In this structure, it is preferable to provide the ion exchange device 20 at the upstream side and the membrane treatment device 21 downstream of the ion exchange device 20 so that impurity ion removal is effected first by the ion exchange device 20 and particulate removal is then effected by the membrane treatment device 21. It is preferable to provide the membrane treatment device 21 downstream of the ion exchange device 20 because there may be a possibility that the ion exchange resin of the ion exchange device 20 is degraded causing fractured particulates to drift away.

When the palladium catalyst has an anion exchange resin as the carrier, the impurity ions which may be eluted into the water to be treated (hydrogen-dissolved water) are cations such as amine compounds. Therefore, it is preferable to construct the ion exchange device 20 as a cation exchange resin device. However, in consideration of the possibility of elution of cations in addition to the anions, it is more preferable to construct the ion exchange device 20 as a mixed-bed ion exchange system in which a mixed ion exchange resin of a cation exchange resin and an anion exchange resin are provided within a resin column.

Even when the impurity removal treatment is effected by the impurity removal device 19 downstream of the hydrogen-dissolving device 12, the quality of the hydrogen-dissolved water is not degraded. More specifically, because hydrogen within the hydrogen-dissolved water does not dissociate in water, there is no possibility that a portion of hydrogen is removed and the amount of hydrogen is reduced by the treatment at the ion exchange device 20.

In the present invention, it is also possible to employ an ion adsorption membrane device as the impurity removal device 19. In the ion adsorption membrane device, the membrane itself has the ion exchange functionality, and thus, the impurity ion removal treatment by ion exchange and the particulate removal treatment can be simultaneously effected by a single device. As the ion adsorption membrane in the ion adsorption membrane device, it is possible to employ, for example, a hydrophilic filter in which an ion exchange groups are provided within pores of a polyethylene membrane, or any other known ion adsorption membrane. The shape and structure of the membrane may be hollow fibers or pleated.

In the impurity removal device 19 shown in FIG. 1, when there is no elution of impurity ions caused by the treatment in the palladium column 17 or the amount of elution is small, it is not necessary to provide the ion exchange device 20. In this case, the impurity removal device 19 may comprise only the membrane treatment device 21.

The membrane treatment device 21 may have a system wherein concentrate water containing the impurities obtained by the membrane treatment is separated from the treated water and then discharged out of the device or a dead-end filtration system.

Referring again to FIG. 1, reference numeral 22 represents a pipe for introducing the hydrogen-dissolved water exiting from the impurity removal device 19 to wash devices 30. The pipe 22 is branched into a branch pipe 27 and a branch pipe 28 which are respectively connected to a wash device 30.

An alkali solution tank 23 is connected to the pipe 22. The alkali solution tank 23 is configured such that it is pressurized by the pump 24 to allow an alkali solution to be supplied through an alkali solution supply pipe 29 into the pipe 22 and to allow the alkali solution to be added and mixed in the hydrogen-dissolved water flowing in the pipe 22. Through the addition of the alkali solution, the hydrogen-dissolved water becomes alkaline and the oxidation-reduction potential of the hydrogen-dissolved water can be shifted further towards reductive side (that is, the minus value of the oxidation-reduction potential can be increased). As a consequence, the efficiency of particulates removal and the particulate re-adhesion prevention can be further improved.

When the pH of the hydrogen-dissolved water is adjusted to the alkaline side, it is preferable that the pH of the hydrogen-dissolved water is adjusted to a value greater than 7 and less than 11, more preferably, in a pH range of 8 to 10. As the alkali which is to be added, an aqueous solution of alkali such as ammonium water, sodium hydroxide, potassium hydroxide, and tetramethyl ammonium hydroxide (TMAH) or an alkaline gas such as ammonium gas may be employed. It is preferable to use ammonium water or ammonium gas because when ammonia water or ammonium gas is employed, no metal ion or organic ion is present as a counterion to the hydroxide ion ($OH^-$). The counterion ($NH_4^-$) is volatile, and thus, impurities will not adhere to the wash target when the hydrogen-dissolved water is used as wash water. If the pH of the hydrogen-dissolved water is 7 or less, the effect of removing the particulates on the surface of the wash target is degraded, and therefore, such pH is not desirable. Likewise, if the pH of the hydrogen-dissolved water is 11 or greater, the alkaline characteristic becomes too strong and the surface of the wash target may be roughed up, and therefore, such pH is also not desirable.

Figure 2:
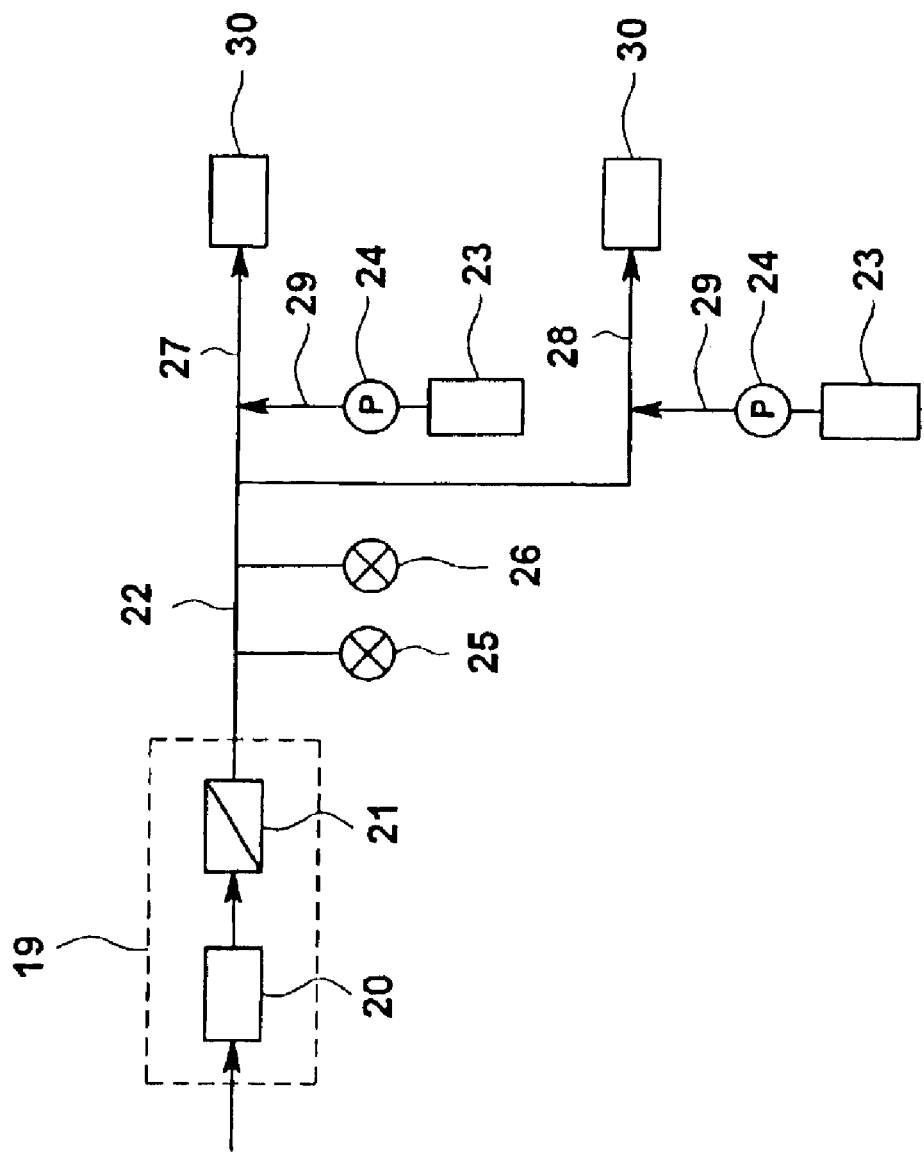
FIG. 2 is a schematic diagram of significant portions of an example configuration of the present invention wherein pH adjustment is applied in each branch pipe.

In the embodiment shown in FIG. 1, the alkali solution tank 23 is connected to the pipe 22 for adding alkali solution. According to another embodiment of the present invention as shown in FIG. 2, it is also possible not to connect the alkali solution tank 23 to the pipe 22, but to connect alkali solution tanks 23 respectively to the branch pipes 27 and 28 branching from the pipe 22 and for introducing the hydrogen-dissolved water to respective wash devices 30 so that alkali solution is added to the branch pipes 27 and 28. With such a configuration, it is possible to add different amounts of alkali solution respectively to the branch pipes 27 and 28 so that hydrogen-dissolved water having differing pHs can be supplied to the wash devices 30 to allow for supply of hydrogen-dissolved water to the wash devices 30 according to the particular objects of the treatment by the wash devices 30.

In FIG. 2, it is also possible to employ a configuration wherein a single alkali solution tank 23 is provided and the alkali solution supply pipe 29 connected to the alkali solution tank 23 is branched. In this configuration, one end of the branched alkali solution supply pipe 29 is connected to the branch pipe 27 and the other end of the branched alkali solution supply pipe 29 is connected to the branch pipe 28 and the amounts of alkali supplied to the branch pipe 27 and to the branch pipe 28 can be arbitrarily controlled.

The hydrogen-dissolved water may be used for washing of a wash target having a high degree of pollution or of a wash target having a very low degree of pollution, for example, in a final rinse step. In the final rinse step, any alkali remaining on the surface of the washing target after the treatment is not desirable. Therefore, if the wash device 30 is a wash device for the final rinse step, it is preferable that an alkali solution is not added from the alkali solution tank 23 upstream of the wash device 30 and that the pH of the hydrogen-dissolved water is not adjusted.

Referring back to FIG. 1, reference numeral 25 denotes a pH meter connected to the pipe 22 and reference numeral 26 denotes an oxidation-reduction potential meter. The pH meter 25 measures pH of the hydrogen-dissolved water and adjusts pH of the hydrogen-dissolved water by controlling the amount of alkali to be added. The oxidation-reduction potential meter 26 measures the oxidation-reduction potential of the hydrogen-dissolved water and adjusts the oxidation-reduction potential of the hydrogen-dissolved water by controlling the amount of hydrogen to be dissolved and/or the amount of alkali to be added.

An operation of the present invention will now be described referring to FIG. 1. High-purity water supplied from the high-purity water production device 1 is introduced into the degassing device 10. At the degassing device 10, oxygen gas, nitrogen gas, and carbon dioxide gas dissolved in the high-purity water are removed. The degasified high-purity water is then introduced into the hydrogen dissolving device 12. Hydrogen gas is dissolved into the high-purity water at the hydrogen dissolving device 12 so that hydrogen-dissolved water having a negative oxidation-reduction potential is produced. The amount of dissolution of hydrogen is controlled through the concentration meter 18 for dissolved hydrogen such that hydrogen-dissolved water having a predetermined concentration of dissolved hydrogen is obtained.

The hydrogen-dissolved water is supplied to the palladium catalyst column 17 where the palladium catalyst triggers reactions between hydrogen peroxide in the hydrogen-dissolved water and hydrogen in the hydrogen-dissolved water and hydrogen peroxide is removed. In this manner, hydrogen peroxide generated by the ultraviolet irradiation in the ultraviolet oxidation device 5 is removed.

Next, the hydrogen-dissolved water is introduced into the impurity removal device 19 where impurity ions within the hydrogen-dissolved water are removed by the ion exchange device 20 and then the impurity particulates within the hydrogen-dissolved water are removed by the membrane treatment device 21. In this manner, it is possible to remove impurity ions such as amine compounds that are detached from the ion exchange resin functioning as a carrier of the palladium catalyst and eluted into the hydrogen-dissolved water during the hydrogen peroxide removal treatment by the palladium catalyst. At the same time, it is possible to reliably remove fractured particulates of the carrier resin mixed in with the hydrogen-dissolved water.

An alkali solution is added from the alkali solution tank 23 and mixed in with the hydrogen-dissolved water thus treated by the impurity removal treatment as described above so that the pH of the hydrogen-dissolved water is adjusted and hydrogen-dissolved water having alkaline characteristics and larger reductive oxidation-reduction potential is obtained. At this stage, the pH value of the hydrogen-dissolved water is controlled through the pH meter 25 and the oxidation-reduction potential of the hydrogen-dissolved water is controlled through the oxidation-reduction potential meter 26.

The alkaline hydrogen-dissolved water thus obtained is transferred to the wash devices 30 via branch pipes 27 and 28, and is used as the wash water for washing semiconductor devices, etc. or as the immersion water.

Figure 3:
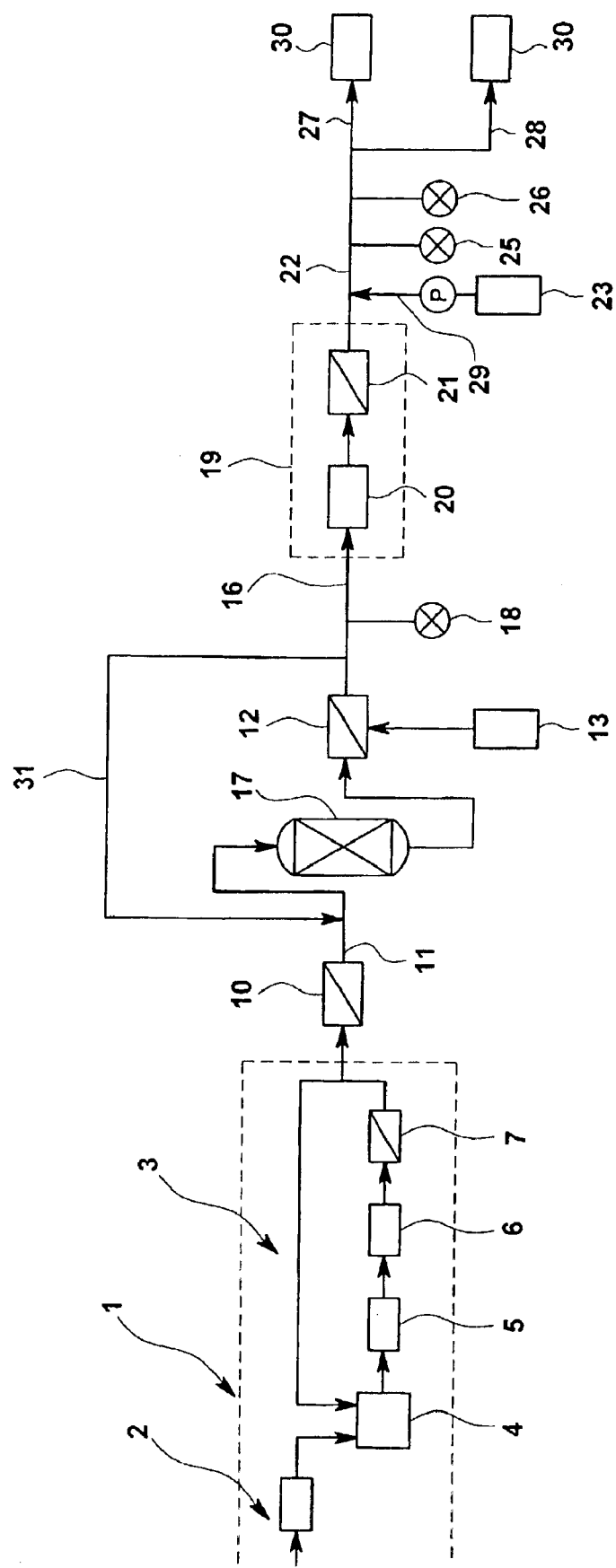
FIG. 3 is a schematic diagram showing a second preferred embodiment of the present invention.

In the above embodiment, the palladium catalyst column 17 is provided downstream of the hydrogen dissolving device 12. In another embodiment of the present invention, it is possible to provide the palladium catalyst column 17 upstream of the hydrogen dissolving device 12 and to circulate and supply a portion of the hydrogen-dissolved water exiting from the hydrogen dissolving device 12 to the palladium catalyst column 17. FIG. 3 shows this embodiment. In FIG. 3, the palladium catalyst column 17 is connected downstream of the degassing device 10 and the hydrogen dissolving device 12 is connected downstream of the palladium catalyst column 17. In addition, the pipe 16 connected to the exit side of the hydrogen dissolving device 12 is branched to form a hydrogen-dissolved water supply pipe 31 having the other end connected to the pipe 11 at the entrance side of the palladium catalyst column 17.

With such a structure, a portion of hydrogen-dissolved water exiting from the hydrogen dissolving device 12 can be circulated via the hydrogen-dissolved water supply pipe 31 to the entrance side of the palladium catalyst column 17, to enable supply of hydrogen necessary for hydrogen peroxide removal treatment by the palladium catalyst. In order to supply a portion of the hydrogen-dissolved water to the hydrogen-dissolved water supply pipe 31, any known means can be used such as valve adjustment. It is also possible to connect the hydrogen-dissolved water supply pipe 31 to the palladium catalyst column 17 to directly introduce a portion of the hydrogen-dissolved water into the palladium catalyst column 17.

In the configuration of FIG. 3, the hydrogen dissolving device 12 is provide between the palladium catalyst column 17 and the impurity removal device 19. In the present invention, the impurity removal device 19 is provided downstream of the palladium catalyst column 17, but the present invention is not limited to a configuration wherein the impurity removal device 19 is provided immediately downstream of the palladium catalyst column 17. The present invention includes a configuration wherein other treatment devices are interposed between the palladium catalyst column 17 and the impurity removal device 19, as shown in FIG. 3.

What is claimed is:

1. A hydrogen-dissolved water production apparatus for producing hydrogen-containing water to which hydrogen is dissolved, comprising:

a hydrogen dissolving device for dissolving hydrogen in high-purity water which has been degasified;

a palladium catalyst device for removing hydrogen peroxide contained in the high-purity water;

a concentration meter configured to measure a concentration of dissolved hydrogen; and impurity removal device provided at the exit side for the treated water of the palladium catalyst device.

2. A hydrogen-dissolved water production apparatus according to claim 1, wherein the impurity removal device comprises a membrane treatment device.

3. A hydrogen-dissolved water production apparatus according to claim 2, wherein the membrane treatment device is a ultrafiltration membrane device or a reverse osmosis membrane device.

4. A hydrogen-dissolved water production apparatus according to claim 1, wherein the impurity removal device comprises an ion exchange device and a membrane treatment device.

5. A hydrogen-dissolved water production apparatus according to claim 4, wherein the membrane treatment device is a ultrafiltration membrane device or a reverse osmosis membrane device.

6. A hydrogen-dissolved water production apparatus according to claim 1, wherein the palladium catalyst device is provided downstream of the hydrogen dissolving device, and the impurity removal device is provided downstream of the palladium catalyst device.

7. A hydrogen-dissolved water production apparatus for producing hydrogen-containing water to which hydrogen is dissolved, comprising:

a hydrogen dissolving device for dissolving hydrogen in high-purity water which has been degasified;

a palladium catalyst device for removing hydrogen peroxide contained in the high-purity water; and impurity removal device provided at the exit side for the treated water of the palladium catalyst device, wherein the hydrogen dissolving device is provided downstream of the palladium catalyst device, the impurity removal device is provided downstream of the hydrogen dissolving device, and a hydrogen-dissolved water supply pipe is provided for circulating a portion of hydrogen-dissolved water to the inlet side of the palladium catalyst device.

8. A hydrogen-dissolved water production apparatus for producing hydrogen-containing water to which hydrogen is dissolved, comprising:

a hydrogen dissolving device for dissolving hydrogen in high-purity water which has been degasified;

a palladium catalyst device for removing hydrogen peroxide contained in the high-purity water;

impurity removal device provided at the exit side for the treated water of the palladium catalyst device; and an alkali adding device for adding an alkali agent to the treated water of the impurity removal device.

9. A hydrogen-dissolve water production apparatus according to claim 7, further comprising:

an alkali adding device for adding an alkali agent to the treated water of the impurity removal device.

* * * * *